US011297383B1

(12) United States Patent
Decrop et al.

(10) Patent No.: US 11,297,383 B1
(45) Date of Patent: Apr. 5, 2022

(54) GAP FILLING USING PERSONALIZED INJECTABLE MEDIA

(71) Applicant: INTERNATIONAL BUSINESS MACHINES CORPORATION, Armonk, NY (US)

(72) Inventors: Clement Decrop, Arlington, VA (US); Zachary A. Silverstein, Austin, TX (US); Martin G. Keen, Cary, NC (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/953,418

(22) Filed: Nov. 20, 2020

(51) Int. Cl.
*H04N 21/44* (2011.01)
*H04N 21/45* (2011.01)
(Continued)

(52) U.S. Cl.
CPC ... *H04N 21/44016* (2013.01); *H04N 21/4383* (2013.01); *H04N 21/442* (2013.01); *H04N 21/458* (2013.01); *H04N 21/4532* (2013.01)

(58) Field of Classification Search
CPC .......... H04N 21/44106; H04N 21/458; H04N 21/442; H04N 21/4383; H04N 21/4532;
(Continued)

(56) References Cited

U.S. PATENT DOCUMENTS 6,609,253 B1 * 8/2003 Swix .................... G11B 27/005
                                                                             348/E7.073
7,502,513 B2 * 3/2009 Linzer .................... H04H 60/37
                                                                                382/173
(Continued)

FOREIGN PATENT DOCUMENTS

CN        102238417 A     11/2011
WO     2019050693 A1     3/2019

OTHER PUBLICATIONS

Ambrozic, C., "Analyze Churn to Keep Viewers Engaged," Multichannel News, Feb. 13, 2019, [accessed Aug. 25, 2020], 7 pages, Retrieved from the Internet: <URL: https://www.nexttv.com/blog/analyze-churn-to-keep-viewers-engaged>.
(Continued)

*Primary Examiner* — Jefferey F Harold
*Assistant Examiner* — Timothy R Newlin
(74) *Attorney, Agent, or Firm* — Caleb D. Wilkes

(57) ABSTRACT

A method, computer system, and a computer program product for media consumption gap filling are provided. Notification that a first user has selected a first broadcast channel to view while the first broadcast channel is showing a first program may be received. A desired program scheduled to be presented via the first broadcast channel at a time after an end of the first program may be determined. A first duration may be calculated that starts at a current time and ends at a scheduled time of commencement of the desired program. First gap-filling content that has a duration sufficient to fill the first duration may be identified. The first gap-filling content may be from a first personalized media corpus associated with the first user. The first gap-filling content may be presented.

20 Claims, 7 Drawing Sheets

(51) Int. Cl.
*H04N 21/438* (2011.01)
*H04N 21/458* (2011.01)
*H04N 21/442* (2011.01)

(58) Field of Classification Search
CPC .......... H04N 21/25891; H04N 21/251; H04N 21/44204
See application file for complete search history.

(56) References Cited

U.S. PATENT DOCUMENTS

| | | | | |
|---|---|---|---|---|
| 8,332,899 | B2* | 12/2012 | Morrissey | H04N 21/8456 725/97 |
| 8,726,312 | B1* | 5/2014 | Hewinson | H04N 21/4532 725/34 |
| 9,473,730 | B1* | 10/2016 | Roy | H04H 60/45 |
| 2003/0084446 | A1* | 5/2003 | Thurston | H04N 21/26283 725/44 |
| 2005/0102695 | A1* | 5/2005 | Musser | G11B 27/36 725/34 |
| 2005/0160458 | A1* | 7/2005 | Baumgartner | H04N 21/44222 725/46 |
| 2006/0161950 | A1* | 7/2006 | Imai | H04N 21/4627 725/46 |
| 2007/0033623 | A1* | 2/2007 | Fredrickson | H04N 7/17318 725/88 |
| 2007/0276926 | A1* | 11/2007 | LaJoie | G06F 21/10 709/219 |
| 2008/0097949 | A1* | 4/2008 | Kelly | H04N 7/163 706/52 |
| 2008/0120638 | A1* | 5/2008 | King | H04H 20/24 725/32 |
| 2008/0297669 | A1* | 12/2008 | Zalewski | H04N 7/163 348/844 |
| 2012/0210230 | A1* | 8/2012 | Matsuda | G11B 27/034 715/723 |
| 2012/0233631 | A1* | 9/2012 | Geshwind | H04N 21/2547 725/1 |
| 2013/0031594 | A1* | 1/2013 | Sansom | G06F 16/7867 725/114 |
| 2013/0173796 | A1* | 7/2013 | Grab | H04N 21/25833 709/225 |
| 2014/0281972 | A1* | 9/2014 | Kramer | H04N 21/26258 715/716 |
| 2014/0289779 | A1* | 9/2014 | Ren | H04N 21/4668 725/53 |
| 2015/0016800 | A1* | 1/2015 | Bowers | H04N 21/482 386/241 |
| 2015/0026706 | A1* | 1/2015 | Leamon | H04N 21/4668 725/9 |
| 2015/0074732 | A1* | 3/2015 | Green | H04N 21/23106 725/93 |
| 2015/0245105 | A1* | 8/2015 | Wickenkamp | H04N 21/252 725/44 |
| 2015/0293928 | A1 | 10/2015 | Chen | |
| 2015/0382042 | A1* | 12/2015 | Wagenaar | H04L 65/605 725/34 |
| 2016/0142761 | A1* | 5/2016 | Govinde | H04N 5/775 386/296 |
| 2017/0085933 | A1* | 3/2017 | Czeck, Jr. | H04N 21/26258 |
| 2017/0289641 | A1* | 10/2017 | Patel | H04N 21/6125 |
| 2018/0081618 | A1* | 3/2018 | McLean | H04N 21/8113 |
| 2019/0104325 | A1 | 4/2019 | Linares | |
| 2020/0221052 | A1* | 7/2020 | Yoon | H04N 7/17318 |
| 2020/0221181 | A1* | 7/2020 | Gupta | H04N 21/252 |

OTHER PUBLICATIONS

IBM Watson Media, "Media & Entertainment Video Solutions," [accessed Aug. 25, 2020], 5 pages. Retrieved from the Internet: <URL: https://www.ibm.com/watson/media/video-solutions-for-media-entertainment-companies>.

IBM, Hulu, "Hulu and IBM Watson Advertising Pioneer a New Way to Connect with Subscribers with IBM Watson Ads," [accessed Aug. 25, 2020], 4 pages, Retrieved from the Internet: <URL: https://www.ibm.com/case-studies/hulu-watson-advertising>.

Liptak, A., "The MPAA says streaming video has surpassed cable subscriptions worldwide," The Verge, Mar. 21, 2019, [accessed Aug. 25, 2020], 4 pages, Retrieved from the Internet: <URL: https://www.theverge.com/2019/3/21/18275670/mpaa-report-streaming-video-cable-subscription-worldwide>.

Mell et al., "The NIST Definition of Cloud Computing", National Institute of Standards and Technology, Special Publication 800-145, Sep. 2011, 7 pages.

Shyam, R., "5 Strategies to Reduce Churn in OTT Video Services," Evergent, Jan. 28, 2019, [accessed Aug. 25, 2020], 7 pages, Retrieved from the Internet: <URL: https://www.evergent.com/2019/01/28/5-strategies-to-reduce-churn-in-ott-services/>.

Yospace Technologies Ltd, "Dynamic Ad Replacement", [accessed Aug. 25, 2020], 11 pages, Retrieved from the Internet: <URL: https://www.yospace.com/tag/dynamic-ad-replacement/>.

Davis, R., "Pre-Show Entertainment 101", Drafthouse.com News, Nov. 16, 2012, [accessed Nov. 12, 2020], 8 pages, Retrieved from the Internet: <URL: https://drafthouse.com/news/pre-show-entertainment-101>.

* cited by examiner

US 11,297,383 B1

GAP FILLING USING PERSONALIZED INJECTABLE MEDIA

BACKGROUND

The present invention relates generally to the field of media consumption, particularly in a hybrid streaming environment.

SUMMARY

According to one exemplary embodiment, a method for media consumption gap filling is provided. The method may include receiving notification that a first user has selected a first broadcast channel to view while the first broadcast channel is showing a first program. A desired program scheduled to be presented via the first broadcast channel at a time after an end of the first program may be determined. A first duration may be calculated that starts at a current time and ends at a scheduled time of commencement of the desired program. First gap-filling content that has a duration sufficient to fill the first duration may be identified. The first gap-filling content may be from a first personalized media corpus associated with the first user. The first gap-filling content may be presented. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a computer system, method and computer program product for media consumption gap filling. As such, the present embodiments have the capacity to improve the technical field of hybrid streaming for media consumption by helping users, e.g., cord cutters, to access more personalized media for viewing, to increase their viewing enjoyment, and to increase their engagement with the streaming platform. The present embodiments help a user receive personalized media content as they wait for a desired program to start.

Figure 1:
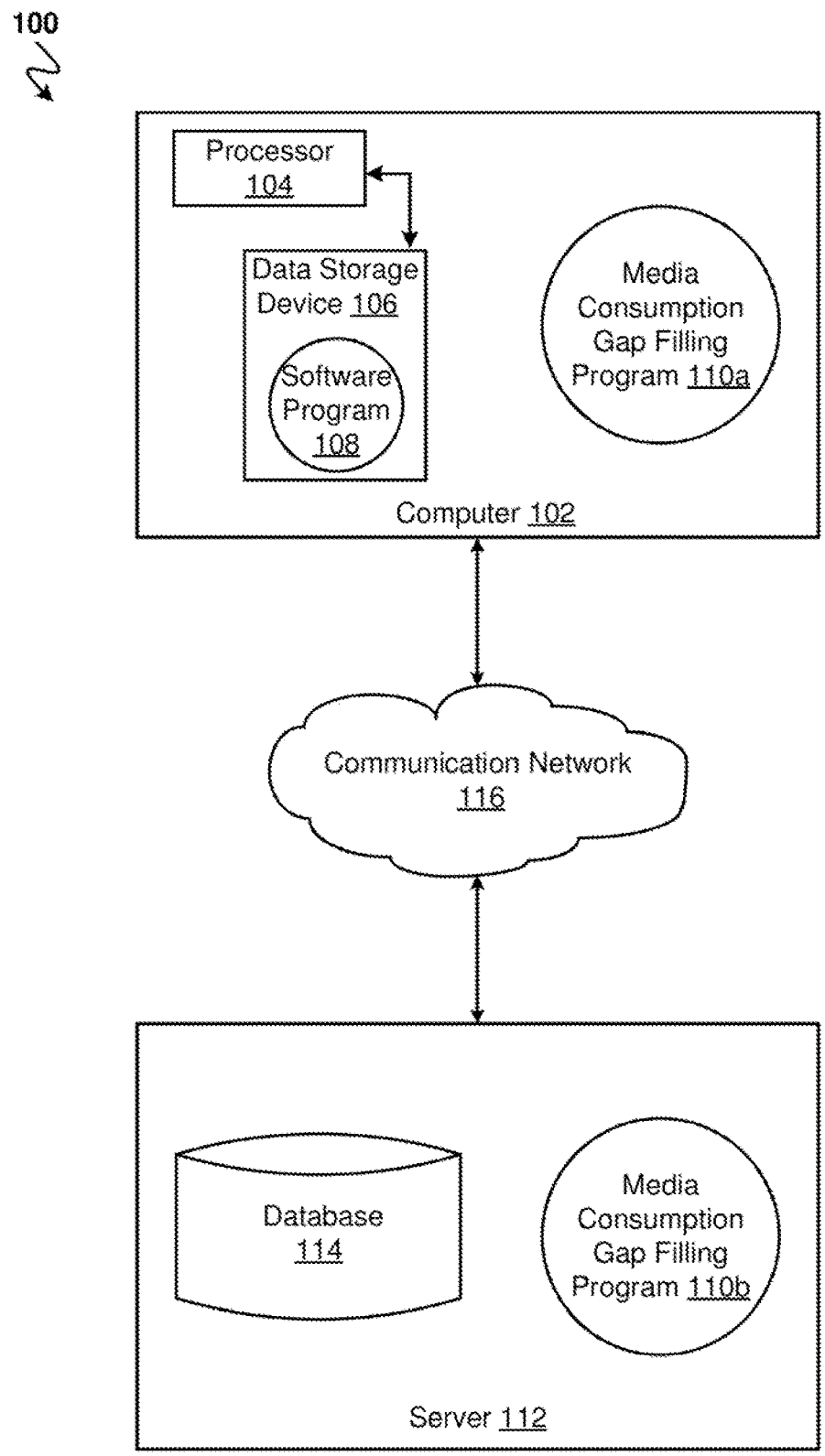
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a media consumption gap filling program 110*a*. The networked computer environment 100 may also include a server 112 that is enabled to run a media consumption gap filling program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the media consumption gap filling program 110*a*, 110*b* may interact with a database 114 that may be embedded in various storage devices, such as, but not limited to a computer/mobile device 102, a networked server 112, or a cloud storage service.

Digital media streaming companies may offer a mixture of recorded content, live content, e.g., sporting events, award shows, news programs, messages from government leaders, and newly premiering shows or episodes that may be viewed by users. As these digital media streaming services are typically accessed via the internet, users can also easily access the huge content of video sources such as those located on YouTube® near in time to while they use the digital media streaming service. Hybrid streaming may include services that allow such recorded content, live content, newly premiering shows, newly-broadcast episodes, and internet-accessible content all to be accessed and viewed.

According to the present embodiment, a user using a client computer 102 or a server computer 112 may use the media consumption gap filling program 110*a*, 110*b* (respectively) to present a user with personalized media from a personalized corpus of injectable media content to view during a gap before a program begins that the user desires to watch. The media consumption gap filling method is explained in more detail below with respect to FIG. 2, FIG. 3A, FIG. 3B, FIG. 4A, and FIG. 4B. The media consumption gap filling program 110*a*, 110*b* may help a streaming service better keep the attention of their customers as the customers wait for a desired program to start.

Figure 2:
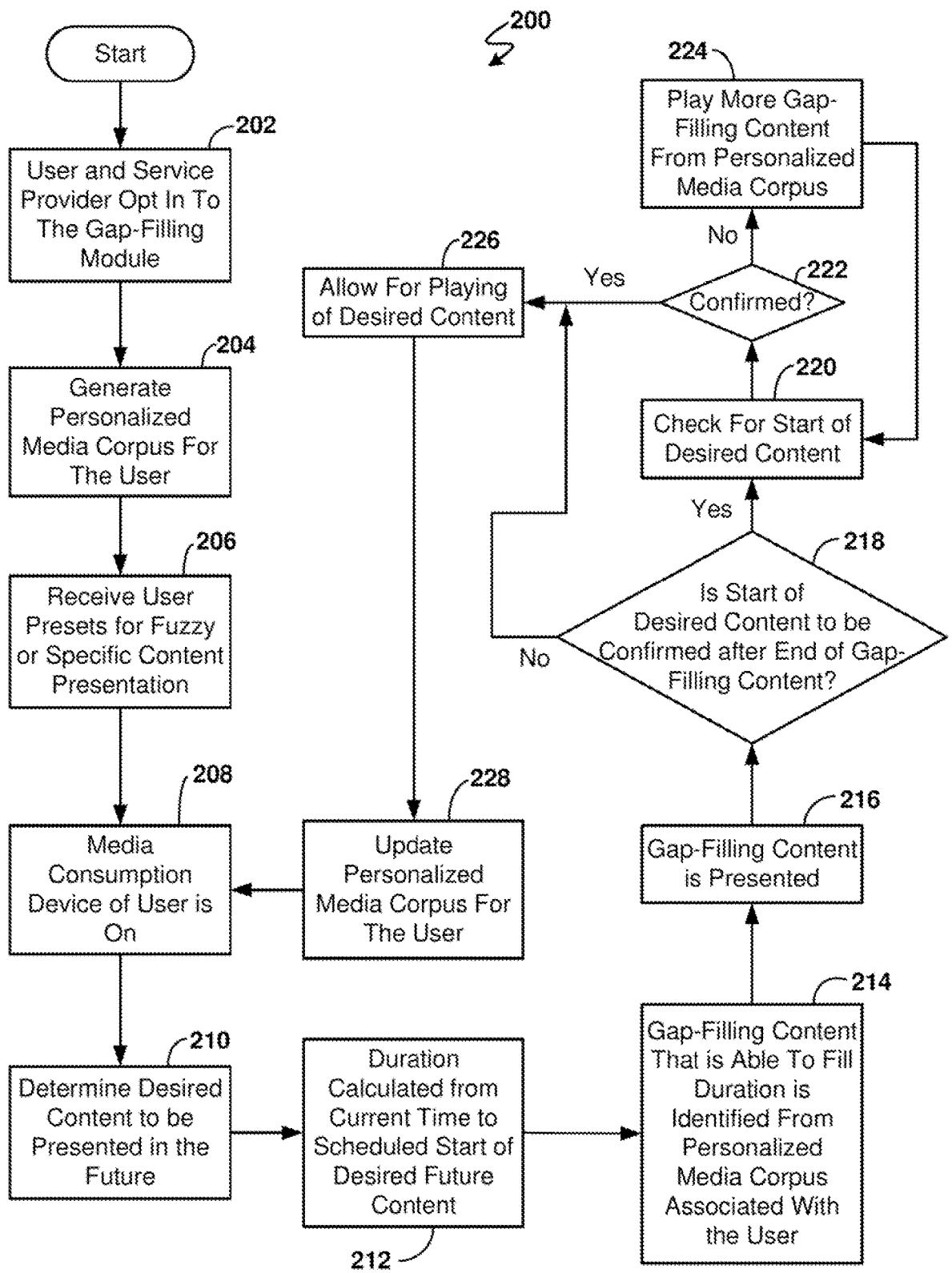
FIG. 2 is an operational flowchart illustrating a process for media consumption gap filling according to at least one embodiment.

Referring now to FIG. 2, an operational flowchart illustrating the media consumption gap filling process 200 used by the media consumption gap filling program 110*a* and 110*b* according to at least one embodiment is depicted.

In step 202 of media consumption gap filling process 200 shown in FIG. 2, a user and service provider opt-in to participate in the media consumption gap filling program 110*a*, 110*b*. Multiple users may opt in so as to participate in the media consumption gap filling program 110*a*, 110*b*. The opting in may include a user downloading the media consumption gap filling program 110*a* to the personal computer, e.g., to the computer 102 shown in FIG. 1, or to another media viewing device of the user, e.g., to a smart television or to a smartphone. The opting in may include a service provider downloading the media consumption gap filling program 110*b* to a server 112 that is used by or owned by the service provider. Alternatively, the opting-in of a service provider may include the service provider downloading another portion of the program while a third party runs and controls the media consumption gap filling program 110*b* on the server 112. The opting-in will inform the user that the agreement means that the media consumption gap filling program 110*a*, 110*b* will log and analyze the future media viewing choices of the user in order to prepare better gap-filling recommendations and choices for the user. The opting-in may include requesting an age of the user, so that the media consumption gap filling program 110*a*, 110*b* may make media choices appropriate for the age of the user. For example, no adult content or content from a TV-MA rated show would be presented via the media consumption gap filling program 110*a*, 110*b* to a youth or child. The opting-in process may prevent a minor from opting-in without the consent of a parent.

In step 204 of media consumption gap filling process 200 shown in FIG. 2, a respective personalized media corpus is generated for the first user and for each user who opts in. The personalized media corpus for the first user may be referred to as a first personalized media corpus. The personalized media corpus may include injectable media content which may include media that may be accessed and injected to the computer/TV/viewing device of the user. A viewing history of the user may be analyzed by artificial intelligence of the media consumption gap filling program 110*a*, 110*b* in order to generate the personalized media corpus. For example, if a viewer has recently watched VHS transfers of a comedy show X on YouTube®, then the artificial intelligence of the media consumption gap filling program 110*a*, 110*b* may load in segments, e.g., ten-minute segments, of a later different comedy show that is designed by an actor from comedy show X or from a creator of comedy show X as gap-filling content for that viewer/user. The artificial intelligence may use links between a same actor between the two shows, as well as the same genre—in the above example: comedy—as causing the choice of adding the later different comedy show clips or segments or episodes into the personal corpus of personal injectable media content for the user/viewer.

The personal media corpus of injectable media content may include recap content of media that has been previously viewed by the user. The personal corpus of injectable media content may include an end portion of a first media content, whereby a beginning portion of the first media content had been previously viewed by the first user. The media consumption gap filling program 110*a*, 110*b* may integrate media pieces from different media platforms. The media consumption gap filling program 110*a*, 110*b* may retrieve social media such as YouTube®, Instagram®, and/or TikTok® videos in order to build the personalized corpus of injectable media content associated with the user. Instagram® and TikTok® videos may necessarily be of a shorter length based on time limits built into the Instagram® and TikTok® platforms for videos. For example, these videos may have a length shorter than two minutes. YouTube® videos may be of a shorter length, e.g., less than two minutes in length, or may be of a longer length. The media consumption gap filling program 110*a*, 110*b* may also retrieve videos of a medium length, e.g., from two to fifteen minutes, to add to the personal corpus of injectable media content associated with the user. Such medium-length videos may be from social media, may be shorts from a streaming corpus, or may be an entire TV show either without or without commercial breaks and advertisements in such commercial breaks. The media consumption gap filling program 110*a*, 110*b* may also retrieve videos of a long length, e.g., fifteen minutes or more, to add to the personal corpus of injectable media content associated with the user. Such longer-length videos may be from social media, may be entire long length videos or portions of long length videos, may be long television or broadcast shows, or may also be YouTube® videos.

For a user who regularly watches a Show X, videos for the personal corpus of injectable media content may include recaps of previous episodes of the Show X in the current season or may include recaps of previous seasons of the Show X, with the recaps being produced by the producers of the Show X or by an independent authorized third party.

The personal corpus may also include new videos from content producers to which the user subscribes on YouTube®, a sports highlight package featuring highlights from recent games from favorite sports teams of the user, a portion of content of other shows or videos which the user had previously started but did not finish, and/or nature show or other shows about animals, e.g., dogs, which are of interest to a user.

A graphical user interface may be generated by the media consumption gap filling program 110a, 110b and may ask the user which shows the user plans on regularly watching. This watch data that is input may be used by the media consumption gap filling program 110a, 110b to identify related media content which may be added to the personal corpus of injectable media content for the user.

The generation of the personalized media corpus in step 204 may include the media consumption gap filling program 110b analyzing user-provided media preferences that may be obtained when the user opts-in to the media consumption gap filling program 110a, 110b. For example, when a user opts-in the user may indicate a preference for sketch comedy, for parkour videos, for all media showing a certain actor or actress, for all media regarding a certain sport or a certain sports team, for all media regarding a certain music group or dance group, etc. The opting-in may also include the user indicating which shows that the user regularly watches, so that a user profile saved by the media consumption gap filling program 110b may more quickly realize when a user is waiting to watch that show and would prefer to be shown personalized media during the wait. Preferences indicated by the user and gathered by the media consumption gap filling program 110b may then be compared to metatags or tags that are provided in videos or other media or to titles for videos or other media. For example, some media may include a tag for a particular sports team, a particular actor, or for particular animals which may help the media consumption gap filling program 110b to match such tagged media with users who indicated a preference for those media types or tags. Media guides may include such descriptive language or tags that can be compared to the keywords saved in the gap-filling profile for the user that is stored by the media consumption gap filling program 110b, e.g., in the database 114. The step 204 may include topic analysis and natural language processing, e.g., Word2Vec processing, of the keywords from the user preferences or of keywords from a watch history of the user to compare with tags in available media content and in new media content such as media presented on social media. If the metatags or tags of a media element match the user profile, then that media element may be added to the personalized media corpus for the user.

The personal media corpus associated with the user may be stored in a memory, e.g., in the database 114, so that the media consumption gap filling program 110b can access the personalized media corpus and retrieve media content from the personal corpus. In some instances, links to the media content or access directions to the media content may be stored in the database 114 instead of the entire media file themselves being stored in the database 114. When links or access directions are stored in the database 114, the media consumption gap filling program 110a, 110b may regularly check the links or access directions to confirm that the media content is still available at those links. When the media content is no longer accessible, then the media consumption gap filling program 110a, 110b may remove or delete the links or access directions to same from the personal corpus of injectable media content.

Figure 3A:
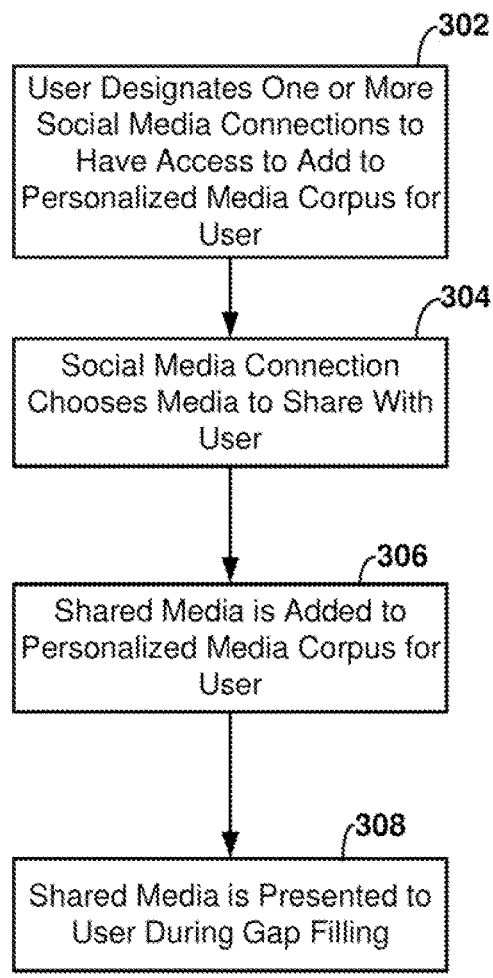
FIG. 3A is an operational flowchart illustrating a process for addition to corpus of personalized media via a social media connection according to at least one embodiment.

The step 204 of media consumption gap filling process 200 may include part of the media-from-social-connection process 300 shown in FIG. 3A. In the media-from-social-connection process 300, in step 302 a designation is received that the user chooses one or more of his or her social media connections to have access to add media content to the personalized media corpus associated with the first user. This chosen social media connection may be considered a contributor to the personal media corpus associated with the first user. In step 304, the designated social media connection chooses a video or other media to share with the user. This shared video/media may be referred to as friend media content. In step 306, the shared video/media is added to the personalized media corpus associated with the first user so that this friend media content may be available to be shown to the user as gap-filling content as the user waits to watch a desired program. The media consumption gap filling program 110a, 110b may scrape social media accounts of the user, email accounts of the user, or devices of the user to find messages, links, or posts that have media content from a designated connection or from a contributor. Then these scraped media may be added to the personalized media corpus for the user.

Figure 4A:
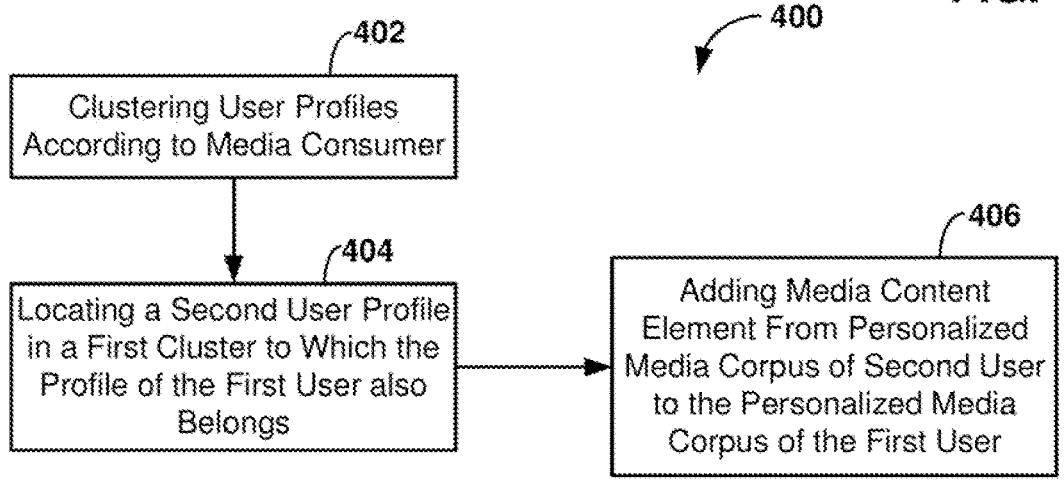
FIG. 4A is an operational flowchart illustrating a process for adding to the personalized media corpus associated with the first user according to at least one embodiment.

The step 204 of media consumption gap filling process 200 may also include a media-adding-from-similar-user process 400 that is shown in FIG. 4A. In step 402 of the media-adding-from-similar-user process 400, a plurality of user profiles may be clustered according to media consumed and according to user preferences that were provided by the respective users. This clustering may include feeding the user profile data into a clustering algorithm such as a K-NN algorithm or a K-means algorithm. With the K-means algorithm, the profiles are split up into clusters or buckets. The K-Nearest neighbor function may be used with respect to a new media element found which as output indicates which cluster is closest to the data point for the new media element. In step 404, a second user profile in a first cluster of the plurality of user profiles may be located. A profile of the first user may also be in the first cluster. The second user profile may represent a second user. Another or second personal media corpus of injectable media content may be associated with the second user. In step 406, a media content element from the second personalized media corpus associated with the second user may be added to the first personalized media corpus associated with the first user. This clustering may help the media consumption gap filling program 110a, 110b to better predict what types of media would be interesting to a user and to find new interesting media to add to the personalized media corpus of the user.

In step 206 of media consumption gap filling process 200 shown in FIG. 2, user presets are received for fuzzy or specific content presentation. The user presets may include a first user presetting from the first user. The first user presetting may include a preference for flexible gap filling or for strict ending of the gap filling. The flexible gap filling allows the presenting of gap-filling media content to extend beyond the scheduled time of the commencement of a desired viewing program. The flexible gap filling may in some instances be referred to as fuzzy content presentation. The strict ending of the gap filling causes the presenting to end at the scheduled time of the commencement of the desired content or desired viewing program. The strict ending may be referred to as specific content presentation for the gap-filling. The media consumption gap filling program 110b may save the user presets for a particular user in a memory associated with the media consumption gap filling program 110b, e.g., in the database 114.

In step 208 of media consumption gap filling process 200 shown in FIG. 2, a media consumption device of the user is on. If the media consumption device has been off, when the media consumption device is then turned on so that its status changed from off to on, a notification may be sent and may be received, e.g., by the media consumption gap filling program 110b.

In step 210 of media consumption gap filling process 200 shown in FIG. 2, desired content that is to be presented in the future is determined. The user desires to see that content in the future, e.g., in the near future, e.g., within the next half-hour. The determining of the desired content may include the receiving of a notification that the user has selected a first broadcast channel to view while the first broadcast channel is showing a first program. The selection may include a user, e.g., a first user, turning the media consumption device to the first broadcast channel. The selection may include a user, e.g., a first user, turning the media consumption device to the first broadcast channel and leaving the media consumption device at that first broadcast channel for a particular time, e.g., for a time greater than five seconds or greater than ten seconds. The selection may include the user logging into the channel before a particular upcoming show which is predicted to have high popularity. The selection may include the user opening a digital TV guide and scrolling to a particular upcoming show. This scrolling may include the user leaving the cursor on the entry for the particular upcoming show for a time above a certain threshold, e.g., for more than ten seconds. The desired content or program may in some instances be referred to as a second program. This determination in step 210 may be to determine a desired program that is scheduled to be presented via the first broadcast channel at a time after the end of the first program which had already started when the user engaged the streaming platform or engaged the media consumption gap filling program 110*a*.

In some embodiments of step 210, the determining of the desired content may include the receiving of a notification that the user has turning the media consumption device to the first broadcast channel or has logged into the first broadcast channel at some point within a preceding program before a final commercial break that occurs after the end of the preceding program and before the scheduled start of the desired content. As an average commercial break may be about four minutes in length, in some embodiments of step 210 the determining of the desired content may include the receiving of a notification that the user has turning the media consumption device to the first broadcast channel or has logged into the first broadcast channel at some point within a preceding program at least four or five minutes before the scheduled start time of the desired content. In other embodiments of step 210, the determining of the desired content may include the receiving of a notification that the user has turning the media consumption device to the first broadcast channel or has logged into the first broadcast channel at any point before the scheduled start time of the desired content, even during a final commercial break between a preceding program, e.g., a first program, and the desired program.

The step 210 of media consumption gap filling process 200 may include the media consumption gap filling program 110*a*, 110*b* directly asking the user to input which show is the desired program of the user. This question may be presented via a GUI on a screen of the device of the user or may be presented audibly to the user via a smart speaker with a microphone. The respective responses may be provided by the user typing on a keyboard, by the user scrolling through an online keyboard with a remote control, or by the user audibly speaking a response that is capture by the microphone.

The step 210 may also include artificial intelligence of the media consumption gap filling program 110*a*, 110*b* interpreting acts of the user, a watch history of the user, a watchlist that is input by the user, and broadcast event popularity to determine what upcoming program that the user desires to watch, view, or hear. The artificial intelligence may analyze a cursor location of the computer 102 operated by the user and may analyze event similarity to past content that has been watched by the user. The artificial intelligence may access show ratings and viewership from recent time and from past years to better recognize which shows are more likely to be popular and are more likely to be desired viewing content of the user, e.g., are more likely to be the desired program of the user.

Step 210 may include a receiving of a selection notification that the first user has selected the first broadcast channel more than halfway through a first program duration of the first program. The media consumption gap filling program 110*a*, 110*b* may recognize that the user is not primary interested in the first program, as the first program is already more than half-way finished. Thus, a subsequent program, e.g., the directly following program that may be referred to as a desired program, may be recognized as the viewing program which the user primarily desires to watch.

Step 210 may include the media consumption gap filling program 110*a*, 110*b* comparing the similarity between the content of the currently broadcast program on the channel and the program that is scheduled to subsequently be played on the channel. In instances where the contents are substantially different and where the media consumption gap filling program 110*a*, 110*b* has already recognized an interest of the user to watch the subsequent program, e.g., via an analysis of the user preferences or watch history of the user, the media consumption gap filling program 110*a*, 110*b* may interpret that the user is not interested in watching the currently broadcast program. If the media consumption gap filling program 110*a*, 110*b* makes this conclusion of dissimilar media content of current and subsequent shows, the media consumption gap filling program 110*a*, 110*b* may assume that gap-filling content would be desired by the user as an alternative to the current program which is not of interest to the user.

Step 210 may include the media consumption gap filling program 110*a*, 110*b* making a gap-filling need likelihood analysis, wherethrough the likelihood that the user would prefer gap-filling content in place of the currently broadcast program is analyzed. This analysis may include the media consumption gap filling program 110*a*, 110*b* using a point generation system and a point rating system regarding the likelihood that the user would desire gap-filling content to be presented. The points that are generated for a current broadcast may be based with some percentage, e.g., 80%, on a watch history, on user-provided preferences, and on projected show viewership numbers, and with another percentage, e.g., 20%, on the timing of when in the currently broadcast program the user switched to the channel to view the currently broadcast program (for example, if the currently broadcast program is already more than halfway over when the user switches to the channel). The watch history/user-provided preferences/overall show popularity score may have a higher weight in the score than the timing of the channel selection has. A high score for likelihood will trigger the media consumption gap filling program 110*a*, 110*b* to assume that gap-filling content is needed or desired. A low score for likelihood may cause the media consumption gap filling program 110*a*, 110*b* to assume that gap-filling content is not currently needed or desired.

Figure 5:
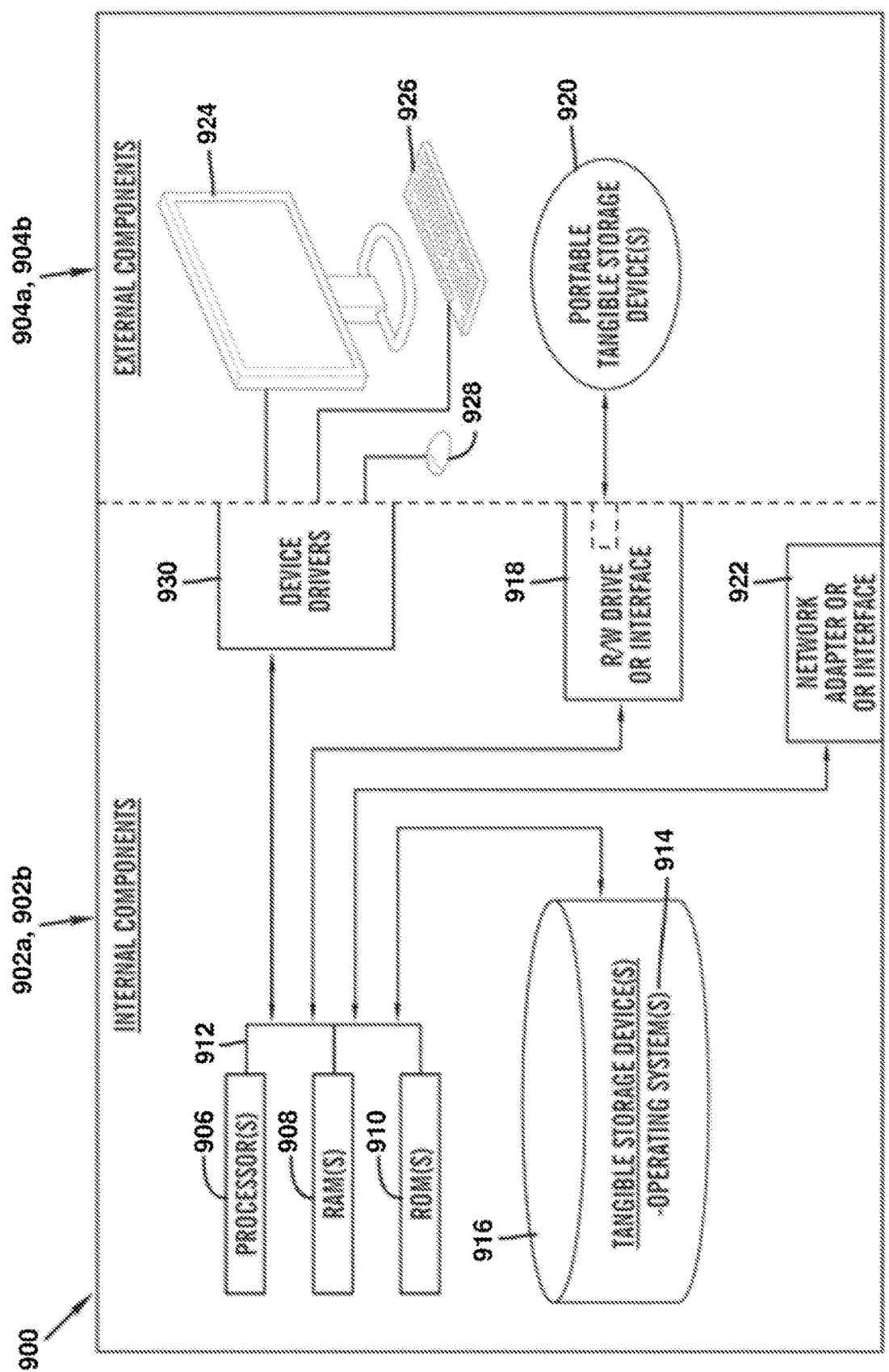
FIG. 5 is a block diagram of internal and external components of computers and servers depicted in FIG. 1 according to at least one embodiment.

Step 210 may also include the user confirming that the program chosen by the artificial intelligence of the media consumption gap filling program 110*a*, 110*b* as the desired content is indeed the content that the user seeks to view or to hear. This confirmation may be performed by a graphical user interface prompt being presented to the user, e.g., at the computer 102, e.g., on a display monitor 924 as is shown in FIG. 5 and described subsequently, which allows the user to click a button that a particular program is the desired primary choice. Such confirmation may be requested via a question that is played up by a speaker connected to the computer 102, and a confirmation response may be picked up by a microphone connected to the computer 102 or to another media device of the user. This audio confirmation may also be performed via a smart speaker which includes a microphone for capturing audio responses that are spoken by the user. Via clicking a box or button on the GUI or via a voice response to the smart speaker, the user may give or deny confirmation of the suggestion provided by the media consumption gap filling program 110a, 110b.

In one embodiment, a user had watched a new episode of Show X on channel Z on a particular day, e.g., Tuesday, during the first broadcast showings of the first two episodes. Then, if the user turns to channel Z on that same day of the week, e.g., Tuesday, later in the month ten minutes before the scheduled start time of the new episode for Show X, then the media consumption gap filling program 110a, 110b may recognize or determine that the user is waiting to watch Show X that is scheduled to start in ten minutes. The media consumption gap filling program 110a, 110b saved and logged the viewings of Show X that the user watched on the previous days in the month. If the user turns their media consumption device, e.g., their computer 102 or other television or smart phone, to channel Z, then the media consumption gap filling program 110a, 110b has additional evidence that the user intends to watch Show X that is scheduled to start in ten minutes. The media consumption gap filling program 110a may also generate a GUI on a display of the computer 102 asking for confirmation if the user intends to watch Show X which starts in ten minutes. In response, the user may actuate a box or button on the GUI to give or deny confirmation. Such confirmation may also be requested via a question and voice response that is played/picked up by a speaker connected to the computer 102.

The media consumption gap filling program 110a may also generate another GUI on the computer 102 asking for confirmation that the user would like to watch personalized videos as the user waits ten minutes for the new episode of Show X to start.

In step 212 of media consumption gap filling process 200 shown in FIG. 2, a duration from a current time to a scheduled start of commencement of the desired future content is calculated. The desired future content may be the desired program. This duration may be considered a first duration. A timestamp may be taken from the program at the current time or at the time of user selection of a desired program. The timestamp may be taken via the internet from other reliable resources that track time or via the time being kept by the computer 102 or by the server 112. This calculation may include a subtraction of the scheduled start time from the current time or from the time of user selection of the desired program. If a user has selected a channel to view at 7:55 pm and a desired program begins at 8:00 pm, the duration may be a total of five minutes. The duration may be calculated to the accuracy of seconds or may be rounded to minutes. The media consumption gap filling program 110a, 110b may regularly scrape TV broadcast schedules that are updated regularly or may access such broadcast schedule to learn the scheduled start time of upcoming shows and the scheduled start time of a desired program. The media consumption gap filling program 110a, 110b may alternatively or in addition have an API connection to the cable provider or to the streaming service to access the published broadcast schedules. The cable provider and streaming service receive updates from individual channels about their schedules, which the cable providers and streaming services use to build a comprehensive broadcast schedule for all channels.

In step 214 of media consumption gap filling process 200 shown in FIG. 2, gap-filling content that is able to fill the duration is identified from the personalized media corpus associated with the user. This gap-filling content may be first gap-filling content and may have a duration sufficient to fill the first duration, e.g., the time from the current time to the scheduled start of the commencement of the desired future content, e.g., the desired program. The personalized videos for the gap-filling content may include recaps of previous episodes of a show from a current season of the show or may include recaps of previous seasons of the show, may include new videos from content producers to which the user subscribes on YouTube®, may include a sports highlight package featuring highlights from recent games from favorite sports teams of the user, and may include a portion of content of other shows or videos which the user had previously started but did not finish. In some instances, the media consumption gap filling program 110a, 110b will identify those media elements stored in the personalized media corpus that have a greatest correlation to the desired content, e.g., to the desired program. This correlation may be a contextual relevancy of the desired program to media in the personalized media corpus for the user. For example, if the desired program is a Show X, the identified and selected gap-filling content from the personalized media corpus may be all or may include media elements that rate, summarize, or preview the Show X. This gap-filling content that is identified may have a duration that is closest to the first duration of all possible media selections in the personal corpus of injectable media content of the user. The gap-filling content that is chosen may be a single media element or may be an aggregation or concatenation of multiple media elements that together fill the time of the first duration, i.e., that alone would not fill all of the first duration but that together may fill all or substantially all of the time of the first duration.

The step 214 may include the media consumption gap filling program 110a, 110b automatically identifying and selecting a content from the personalized media corpus for the first user.

The step 214 may alternatively or in addition include the media consumption gap filling program 110a, 110b presenting one choice or a variety of choices from the personalized media corpus to the user to choose or confirm via manual curation. This presentation for manual curation may include the presentation of a graphical user interface (GUI) that shows or displays the choice or a variety of choices on a screen of a computer 102 or of another device of the user, whereby the user may manually curate a choice by clicking a button or scrolling to the choice and then clicking. This presentation for manual curation may include an audio presentation via a speaker or smart speaker of a device of the user or of the computer 102 of the user, whereby the user may manually curate a choice by speaking a response that is captured by a microphone of the computer 102 or of another device of the user.

The step 214 may alternatively or in addition include the media consumption gap filling program 110a, 110b presenting a filtering question to the user, whereby after the media consumption gap filling program 110a, 110b receives a filtering response from the user the media consumption gap filling program 110a, 110b may more easily identify content from the personalized media corpus that is of interest to the user. This presentation of a filtering question may include the presentation of a graphical user interface (GUI) that shows or displays the filtering question on a screen of a computer 102 or of another device of the user, whereby the user may manually type in a response using a keyboard or a mouse. This presentation of a filtering question may include an audio presentation via a speaker or smart speaker of a device of the user or of the computer 102 of the user, whereby the user may manually respond to the filtering question by speaking a response that is captured by a microphone of the computer 102 or of another device of the user. The filtering question may be regarding the type of filler material that is desired or a source of the filler material that is desired. In one embodiment, the media consumption gap filling program 110a, 110b asks a user if the user prefers to watch a preview or recap video related to a currently broadcast show from a major channel, a portion of an old show that is broadcast as a rerun, another video related to dogs and dog care, or another video about the latest celebrity gossip. The filtering question may ask whether the user wants to watch only desired program-related material or any media material of interest to the user.

The step 214 may include a parental option or sensitivity option for which a rating of the desired program is analyzed and for which gap-filling content is identified that is age-appropriate according to the TV rating and to the channel on which the desired program will be presented.

The step 214 in some instances may include a dynamic check for new media content that can immediately be added to the personalized media corpus that was already generated for the user. This dynamic check may search for media components that have a high or strong relation to the desired program or desired content, but that were not already added to the personalized media corpus. Such a dynamic check may be for newly presented media, e.g., media from social media that was not available during the previous generation of the personalized media corpus that occurred in step 204. If new content is found which has a stronger relation to the desired program than any existing content in the personalized media corpus has with respect to the desired program, then the step 214 may have this newly found content be the identified gap-filling content that bypasses the other content in the personalized media corpus of the user. This dynamic checking may include topic analysis and natural language processing, e.g., Word2Vec processing, of the event description with tags in available media content and in new media content such as media that is presented on social media. Thus, in this instance user preferences or keywords stored for a profile of the user in the media consumption gap filling program 110b may be bypassed and instead keywords for the desired program may be compared to new media content tags. The dynamic checking may include a prompt scraping of social media accounts of the user, email accounts of the user, or devices of the user to find messages, links, or posts that have recently been received from a designated connection or from a contributor that include media to add to the personalized media corpus for the user.

In step 216 of media consumption gap filling process 200 shown in FIG. 2, the gap-filling content that is chosen is presented. As part of step 216, the media consumption gap filling program 110a, 110b may begin to play personalized videos to the user to fill the duration until the desired content starts, e.g., to fill a ten-minute gap or duration until Show X starts. This presentation of the gap-filling content may occur on a first media consumption device of the user or on a second media consumption device of the user, whereby the user intends to watch the desired content on the first media consumption device. The presentation may occur via a presentation of both video and audio, a display of video only, or the playing of audio only. In some embodiments, a queue or buffer memory space may be provided at the viewing device of the user, e.g., at a television or at the computer 102 which allows the gap-filling content to be stored and ready for playing directly at the device of the user.

If in step 206 user presets were received for flexible gap filling, then the presenting may begin a short time after the scheduled start time of the desired content, if the gap-filling content is not finished. Such overlap into the program time for the desired content may be thirty seconds, one minute, two minutes, or some other time portion. In some instances, the media consumption gap filling program 110a, 110b may have DVR capabilities so that the desired content may be shown from the beginning even if the media consumption gap filling program 110b switches to the desired content a short time after the scheduled start time. If in step 206 the user preset a strict ending of the gap filling, then the media consumption gap filling program 110b may switch control of the broadcast channel to the normal broadcast stream precisely at the scheduled start time of the desired content, e.g., of the desired program. In such instances, if the desired content is scheduled to start at 8:00 pm, then the media consumption gap filling program 110a, 110b may switch control of the broadcast channel to the normal broadcast stream precisely at 8:00 μm.

Figure 3B:
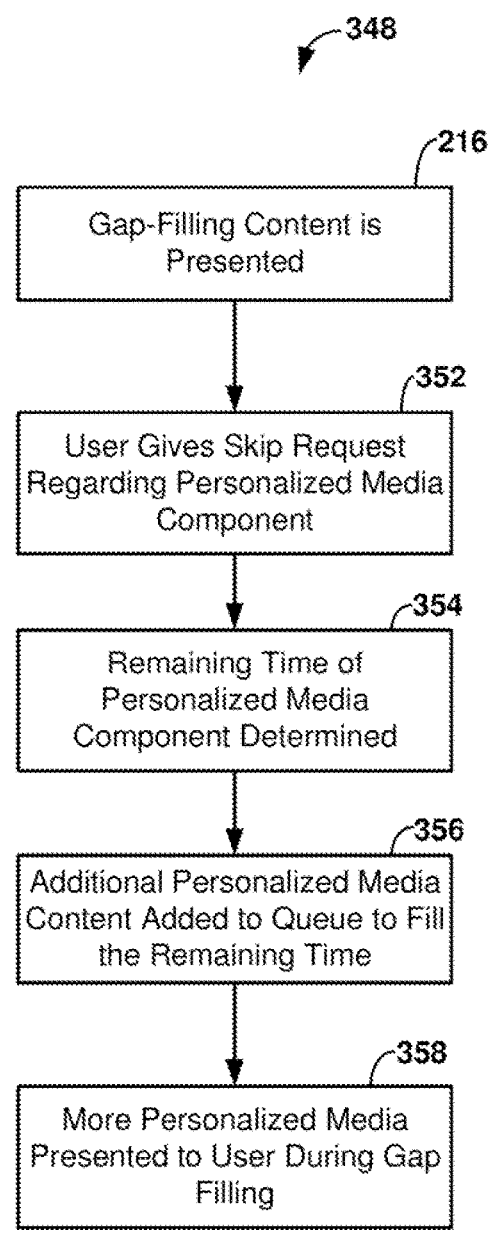
FIG. 3B is an operational flowchart illustrating a process for media component skipping during presentation of personalized media content for gap filling according to at least one embodiment.

This step 216 may include the performance of the media skipping process 348 shown in FIG. 3B. In the media skipping process 348, step 216 is performed first as the gap-filling content is presented which may include presenting a personalized media component to the user during gap filling. In step 352, a skip request is received from the user. The skip request indicates that the user is choosing not to watch the personalized media content, e.g., the first gap-filling content, that was presented during step 216. In step 354, a remaining time of the to-be-skipped personalized media component is determined. The remaining time may be for the unviewed portion of the first gap-filling content.

In step 356, additional personalized media content is added to a queue to fill the remaining time that was determined. As part of this step 356, the additional personalized media content may be identified from the personalized media corpus of injectable media content associated with the first user. The additional personalized media content that is identified may include or may be referred to as second gap-filling content. The second gap-filling content may have a play-length referred to as a replacement duration. The queue may be an access instruction list which the media consumption gap filling program 110a, 110b may use to find the desired media in the internet or on one of the broadcast platforms. The queue may also be a memory storage at the device of the user which can hold the video files which are sent as gap-filling content to the device of the user. In step 358, more personalized media is presented to the user during the gap filling. The additional personalized media content, e.g., the second gap-filling content, that has been added to the queue may be shown initially after the skipping or at the end of the sequence of other media being shown from the personalized media corpus associated with the user. Therefore, this additional personalized media content may solely fill the remaining time of the first duration or may fill a part of the remaining time of the first duration. The skip request performed in step 352 may be done via voice activation that is captured via a microphone associated with the media consumption gap filling program 110a, 110b, e.g., via a microphone in the computer 102 or in another device of the user that may communicate with the computer 102 or with the server 112 via the communication network 116. The skip request performed in step 352 may be done via a remote control or via an input device, e.g., a keyboard such as keyboard 926 shown in FIG. 5 and described below, of the computer 102 or of another device of the user.

The skipping of the media skipping process 348 may at some point during or after the performance of the media skipping process 348 generate a feedback request to the user of whether the user requests a temporary skipping or if the user does not desire to watch the skipped material at any future time. Such feedback request may occur via a GUI or via an audio request via a smart speaker.

This step 216 may include the last step of the media-from-social-connection process 300 shown in FIG. 3A, namely the step 308 where the shared media, e.g., a shared video, or friend media content is presented that was received from a designated social media connection of the user. The designated social media connection was designated as a contributor to the personalized media corpus associated with the user.

In some embodiments, the playing of the gap-filling content in step 216 may include the playing of advertisements that are inserted by the media consumption gap filling program 110a, 110b. Such advertisements would have a shorter length than traditionally occur in regular commercial breaks. Such advertisements would take up some but not all of the duration which the gap-filling content fills. Such advertisements may take up less than half of the duration which the gap-filling content fills. For example, if the gap-filling content was chosen to fill a twelve minute duration before the beginning of a desired program, two minutes or less of the twelve minutes may be advertisements inserted by the media consumption gap filling program 110a, 110b while the remaining ten minutes or more may be the personalized media. Such advertisements that are chosen may have some relation to the desired program, to the gap-filling content, or to preferences for the user that are saved in the user profile.

If a filtering question and response were provided and received in step 214, then the gap-filling content may be presented that was identified based on the response to the filtering question. For example, if the user indicated in response to a filtering question that the gap-filling media should be dog videos, then the gap-filling content presented in step 216 is all dog videos or includes at least some dog videos.

In step 218 of media consumption gap filling process 200 shown in FIG. 2, a query occurs as to whether the start of the desired content is to be confirmed as having occurred after the end of the gap-filling content. A user may set preferences via a GUI or spoken instructions captured by a smart speaker as to whether the user desires confirmation of the start of the desired program. These preferences may be set during the user opt-in or some other previous time. The media consumption gap filling program 110a, 110b may during the gap-filling process also ask the user if starting of desired content is to be confirmed.

If step 218 is negative, in step 220 of media consumption gap filling process 200 shown in FIG. 2, a start of the desired content is checked. In at least some embodiments, this checking may occur by the receiving of a notification from the user that the desired content has started on the broadcast channel. A graphical user interface may be generated and presented to the user to ask whether the desired content has started on the broadcast channel, and when the user actuates a confirmation button then the showing is confirmed. An audio question may be presented to the user via a speaker and then a microphone may capture a response provided by the user.

Figure 4B:
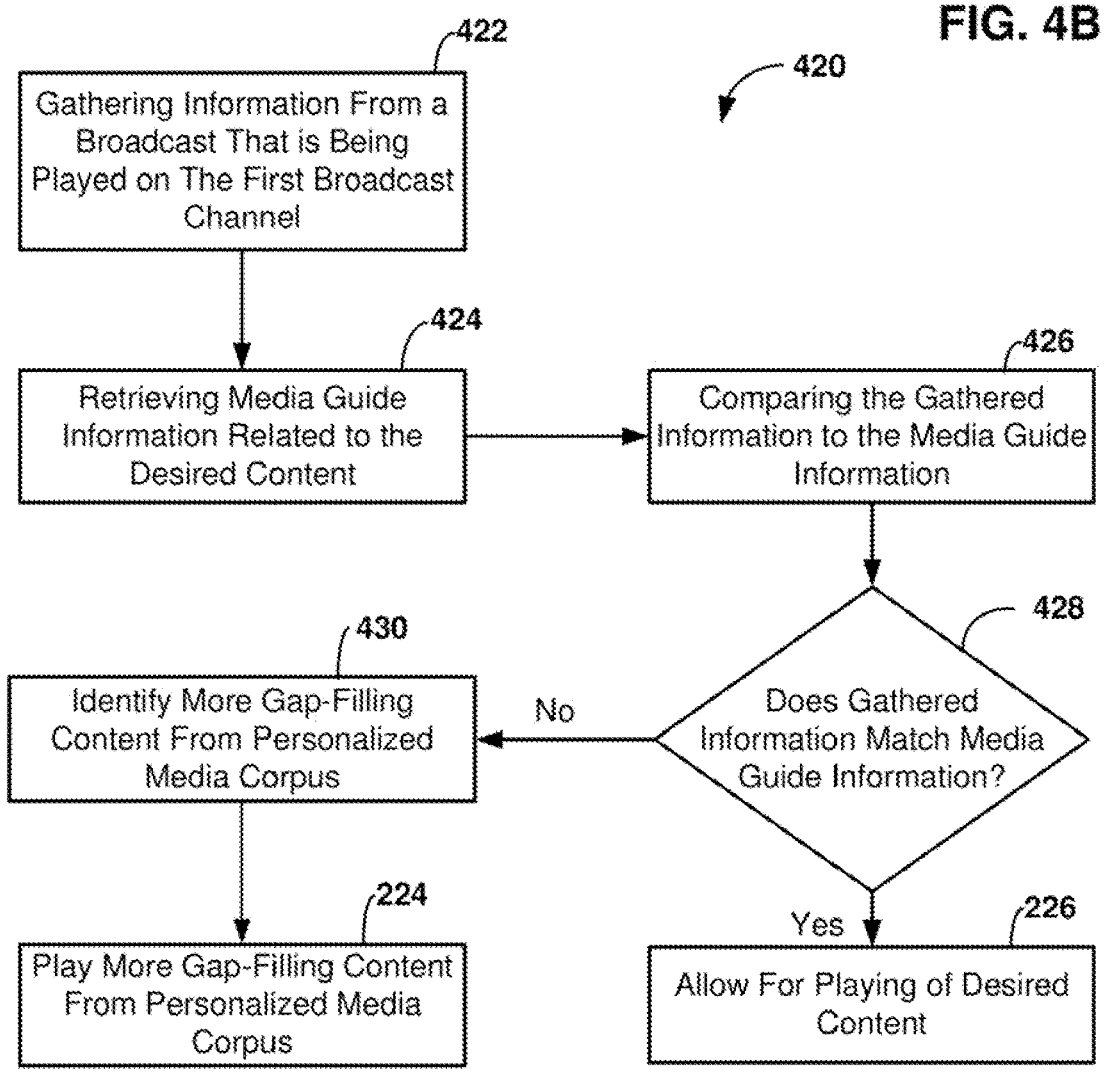
FIG. 4B is an operational flowchart illustrating a process for determining whether a desired media content has commenced on a particular broadcast channel according to at least one embodiment.

The step 220 may include a desired-content-broadcast-confirmation process 420 that is shown in FIG. 4B. This desired-content-broadcast-confirmation process 420 may be performed to determine, after a scheduled start time of the desired content, e.g., of the desired program, whether the desired content has commenced. Sporting events often have uncertain ending times. Their ending times may vary depending on number of timeouts that occurred in a game, number of time stoppages for fouling, video review, or injuries, or on whether the game went into an overtime period. Such varying ending times may interfere with a broadcast schedule that was entered into a media guide for the day, because broadcasting such games or matches to their end may then extend beyond an initially-planned broadcast time window and push into time slots for programs that are scheduled to follow the games or matches. In some instances, a show may be scheduled to start at a certain time but will not actually begin until some time after the scheduled time that was entered into the media guide. In such instances, it would be helpful for the media consumption gap filling program 110a, 110b to confirm if a scheduled program has indeed started at its scheduled time of commencement. The gap filling may be continued if the actual start time for a desired program has been pushed back.

The determining or confirming that occurs with the desired-content-broadcast-confirmation process 420 may include gathering, retrieving, and comparing steps. As part of the desired-content-broadcast-confirmation process 420, in step 422 information from a broadcast being played on the first broadcast channel during a scheduled time of the desired program may be gathered. In step 424, media guide information related to the desired content, e.g., to the desired program, may be retrieved. In step 426, the gathered information may be compared to the media guide information. This comparison may be used in a query of step 428 to indicate a match or not a match for the media that is being shown compared to the desired content that is scheduled to be shown at that time. If the comparison indicates a match in step 428, then step 430 may be performed in that more gap-filling content may be identified from the personal corpus of injectable media content associated with the user. This further gap-filling content may be referred to as second gap-filling content. After step 430, step 224 shown in FIG. 2 may be performed in that more gap-filling content may be played or presented from the personalized media corpus associated with the user. If the comparison indicates a lack of a match in step 428, then step 226 shown in FIG. 2 may be performed in that the desired content, e.g., the desired program, may be allowed to be played or presented on the first broadcast channel. This playing or presenting may occur on a media consumption device, e.g., on a first media consumption device, of the user.

The gathering of information in step 422 may include the gathering of audio information or visual information from the broadcast that is being played on the first broadcast channel during the scheduled time of the desired program.

For the gathering of audio information, the audio output of the show being played may be recorded. The audio recording may then be subjected to speech-to-text conversion to produce a converted text. The converted text may then be compared to text and keywords from the media guide information that describes the desired program. If some or many of the keywords match, then the media consumption gap filling program 110a, 110b may assume that the show being broadcast is the desired program. Thus, the gap-filling is no longer necessary for this iteration of the viewing of the user, because the user can now view the desired program. Audio information may also include the recording of a theme song for a regularly scheduled program. The theme song may be recorded in a user profile if the user has regularly watched that program. The recorded broadcast song and the recorded song in the profile may be compared to determine if the two songs match, whereby a matching indicates that the desired program is indeed being broadcast.

For the gathering of visual information, a plurality of screenshots of the visual video output of the broadcast may be captured and recorded as images by the media consumption gap filling program 110a, 110b. Natural language processing may be performed by the media consumption gap filling program 110a, 110b on the images to parse out any text that is present n the images. Such text may include a title of a show that is presented during an introductory segment of a show. The media consumption gap filling program 110a, 110b may then compare the text to the title that is provided in the media guide information that describes the desired program. If the text matches, then the media consumption gap filling program 110a, 110b may assume that the show being broadcast is the desired program. Thus, the gap-filling is no longer necessary for this iteration of the viewing of the user, because the user can now view the desired program. In some instances, facial images of actors/actresses/participants of a show may be captured in the images. The media consumption gap filling program 110a, 110b may compare these captured images with facial images of actors/actresses/participants that are shown in the media guide information that describes the desired program. If the images match, media consumption gap filling program 110a, 110b may assume that the show being broadcast is the desired program. Thus, the gap-filling is no longer necessary for this iteration of the viewing of the user, because the user can now view the desired program.

In at least some embodiments, the presenting of first gap-filling content, e.g., the presenting that occurs in step 216, may continue until the commencement of the desired content, e.g., the desired program, is confirmed. The confirmation may be provided manually by a user or automatically via the program checking as is described below. The first gap-filling content may be played on a second device of the user while the media consumption gap filling program 110a, 110b confirms via a first device that the desired content has commenced. In some embodiments, the first gap-filling content may be played on a first device of the user while the media consumption gap filling program 110a, 110b confirms via the first device that the desired content has commenced. The media consumption gap filling program 110a, 110b may use another media consumption device or another computer to confirm the commencement of the desired content while the first gap-filling content continues to be presented via the first device of the user. Such other device or other computer may be at a remote location near the server 112 or may include the server 112 interpreting the stream from the channel on which the desired content is scheduled to be broadcast.

Step 222 may constitute a query that is the result of the checking that occurs in step 220. The media consumption gap filling program 110a, 110b may have the results from step 220 to perform step 222 by making a binary decision of either a confirmation or no confirmation.

If the query of step 222 is negative, in step 224 of media consumption gap filling process 200 shown in FIG. 2 more gap-filling content from the personalized media corpus associated with the user is played. This further gap-filling content may be referred to as second gap-filling content. This step 222 may include the identifying of the second gap-filling content from the personal corpus of injectable media content associated with the first user. Procedures for identification may be used that are similar to the procedures that govern the identification of step 214.

If step 218 is negative or if step 222 is affirmative, in step 226 of media consumption gap filling process 200 shown in FIG. 2 the desired content is allowed to be played. As part of this allowance, the media consumption gap filling program 110a, 110b may end all override of broadcast content of the channel of the desired program, so that the desired program may be freely played and viewed by the user. Because the user is now watching a desired program, the current need for gap-filling content has ended.

In step 228 of media consumption gap filling process 200 shown in FIG. 2, the personalized media corpus that is associated with the user is updated. This step 228 may include a deletion of the first gap-filling content that was viewed by or presented to the user in step 216. This first gap-filling content may be deleted from the personal corpus of injectable media content associated with the first user, because the user has now seen it and may not wish to view it again. A user may set preferences in a user profile of the media consumption gap filling program 110a, 110b as to whether the user is interested in seeing repeats of media content or whether content should be deleted from the corpus after it has been viewed.

The step 228 may also include adding to the personalized media corpus associated with the first user, e.g., as occurs with the media-adding-from-similar-user process 400 that is shown in FIG. 4A. Such adding may include steps of clustering multiple user profiles, locating a cluster-matched profile of another user, and adding content from the media corpus of the other user to the personalized media corpus associated with the first user. In step 402 of the media-adding-from-similar-user process 400, a plurality of user profiles may be clustered according to media consumed. This step 402 may be performed by the media consumption gap filling program 110b which may have access to the profiles of various users who have opted-in to participated in the media consumption gap filling program 110a, 110b. The clustering may include a K-means approach to the clustering which uses preferences and watch history of the various users. In step 404, a second user profile in a first cluster of the plurality of user profiles may be located. A profile of the first user may also be in the first cluster. The second user profile may represent a second user. Another or second personal corpus of injectable media content may be associated with the second user. In step 406, a media content element from the second personalized media corpus associated with the second user may be added to the first personalized media corpus associated with the first user.

The step 228 may include part of the media-from-social-connection process 300 shown in FIG. 3A. In the media-from-social-connection process 300, in step 302 a designation is received that the user chooses one or more of his or her social media connections to have access as a contributor to add media content to the personalized media corpus associated with the first user. In step 304, the designated social media connection chooses a video to share with the user. In step 306, the shared video/media is added to the personalized media corpus associated with the first user. The shared video/media may be referred to as friend media content.

If a skipping request occurred in that the user requested to skip some personalized media content that was presented in step 216, e.g. if a skipping occurred according to the media skipping process 348 shown in FIG. 3B and described above, in step 228 this skipping may be used to help update the personalized media corpus as occurs in step 228. In such embodiments, this step 228 may include a deletion of the skipped content from the personalized media corpus and may include the deletion or demotion of other content that is similar to the skipped content. Such demotion may include other similar material receiving a lower priority when future gap-filing content is identified, e.g., in future repetitions of the step 214. Such deletion or demotion may in some embodiments occur if a user confirms, via a subsequent input request generated by the media consumption gap filling program 110a, 110b, that the user is not interested in watching the skipped material at a future time. In some instances, the user may be interested in viewing the skipped material at a future time but was not interested in watching the skipped material at the time of skipping. A GUI or audio request from the media consumption gap filling program 110a, 110b may help make this interpretation of the skipping action made by the user. Thus, the skipping may constitute a feedback loop to help the artificial intelligence of the media consumption gap filling program 110a, 110b more accurately select media components which are of interest to the user.

The step 228 may also include a feedback request that is generated by the media consumption gap filling program 110a, 110b as to whether the user enjoyed some of the gap-filling content that was presented to the user. If the user indicates approval or enjoyment, e.g., via responding to a GUI generated by the media consumption gap filling program 110a, 110b or by giving an audio response to an audio question presented by the media consumption gap filling program 110a, 110b, then the media consumption gap filling program 110a, 110b may seek out media content that is similar to the approved or enjoyed content to add such similar content to the personalized media corpus of the user. Such a feedback request may be generated during a commercial of the desired program, immediately after the presentation of the gap-filling content, or during a subsequent time such as the next time the user turns on a media consumption device. Such feedback may be sought by the media consumption gap filling program 110a, 110b providing a button indicating "Show me more videos like this" that appears on a GUI that is visible to the user and which can be clicked by the user. Such feedback may be received by the media consumption gap filling program 110a, 110b if the user audibly expresses, to a smart speaker, approval of or satisfaction with the gap-filling content that was shown.

As part of step 228, a profile of the user in the media consumption gap filling program 110a, 110 may be updated so that the user watch history is tracked and so that the media consumption gap filling program 110a, 110b may better expect when a user is waiting to watch a desired program. For example, if a user watches a lot of media associated with children or youth programming, then the media consumption gap filling program 110a, 110b can expect that the user logging into a children-focused or youth-focused channel partially through the duration of a program may indicate that the user is waiting for a new show or episode to be subsequently broadcast on the channel in the immediate near future. This updated user profile may be used in conjunction with the personalized media corpus to better gap fill for the user during their media consumption.

The media consumption gap filling process 200 can be a cycle that is repeated, so that after step 228 is performed, the media consumption gap filling process 200 may return to step 208 as part of a cycle.

In the disclosure, the adding or sharing of media content may refer to the adding or sharing of links to the content or access instructions to access the content which allow the receiver to find the media content without the entire media file having to be initially sent to the user. Alternatively, the adding or sharing of media content may refer to the actual entire media file being sent or added to the corpus or queue.

The artificial intelligence used by the media consumption gap filling program 110a, 110b may use a recurrent neural network architecture to produce output of target program suggestions, e.g., desired program suggestions, and output of the generation of or addition to the respective personalized media corpus for the users of the media consumption gap filling program 110a, 110b. The neural network architecture may use the user watch history, user watch preferences that are input, program viewership information, friend media recommendations, and clustering information as inputs into the neural network. When a new media element is input into the neural network, the neural network of the artificial intelligence of the media consumption gap filling program 110a, 110b may as output add the new media element into the personalized media corpuses of the users for which the new media element is considered to be a match. When a new user with user preferences and watch plan or watch history is input into the neural network, the neural network of the artificial intelligence of the media consumption gap filling program 110a, 110b may as output build a personalized media corpus for the user. When user immediate program viewing and scrolling characteristics and daily media guide information are input into the neural network along with the user profile, the output produced may be a suggested desired program, which the user is waiting to watch, and suggested gap-filling content for the user while the user waits for the desired program to start. The user-provided feedback regarding gap-filling content and skipping requests made by the user may help train the neural network to make improved gap-filling content suggestions and to better recognize an intended desired program and the appropriate time for providing gap-filling content.

It may be appreciated that FIGS. 2, 3A, 3B, 4A, 4B provide only an illustration of some embodiments and do not imply any limitation with regard to how different embodiments may be implemented. Many modifications to the depicted embodiments may be made based on design and implementation requirements.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, 902b and external components 904a, 904b illustrated in FIG. 5. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the media consumption gap filling program 110a in client computer 102, and the media consumption gap filling program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the media consumption gap filling program 110a, 110b can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108 and the media consumption gap filling program 110a in client computer 102 and the media consumption gap filling program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the media consumption gap filling program 110a in client computer 102 and the media consumption gap filling program 110b in network server computer 112 are loaded into the respective hard drive 916. The network may comprise copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
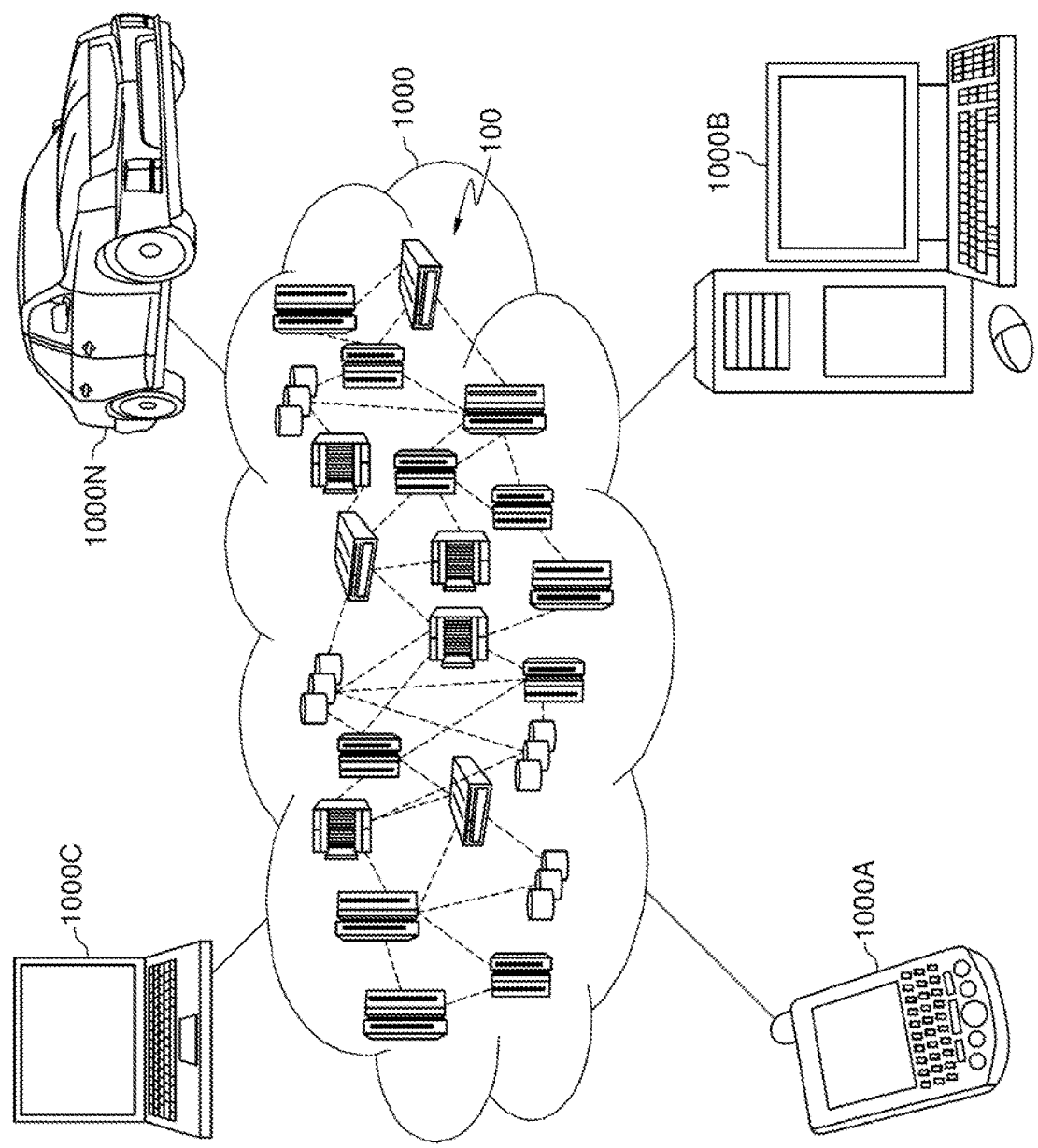
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
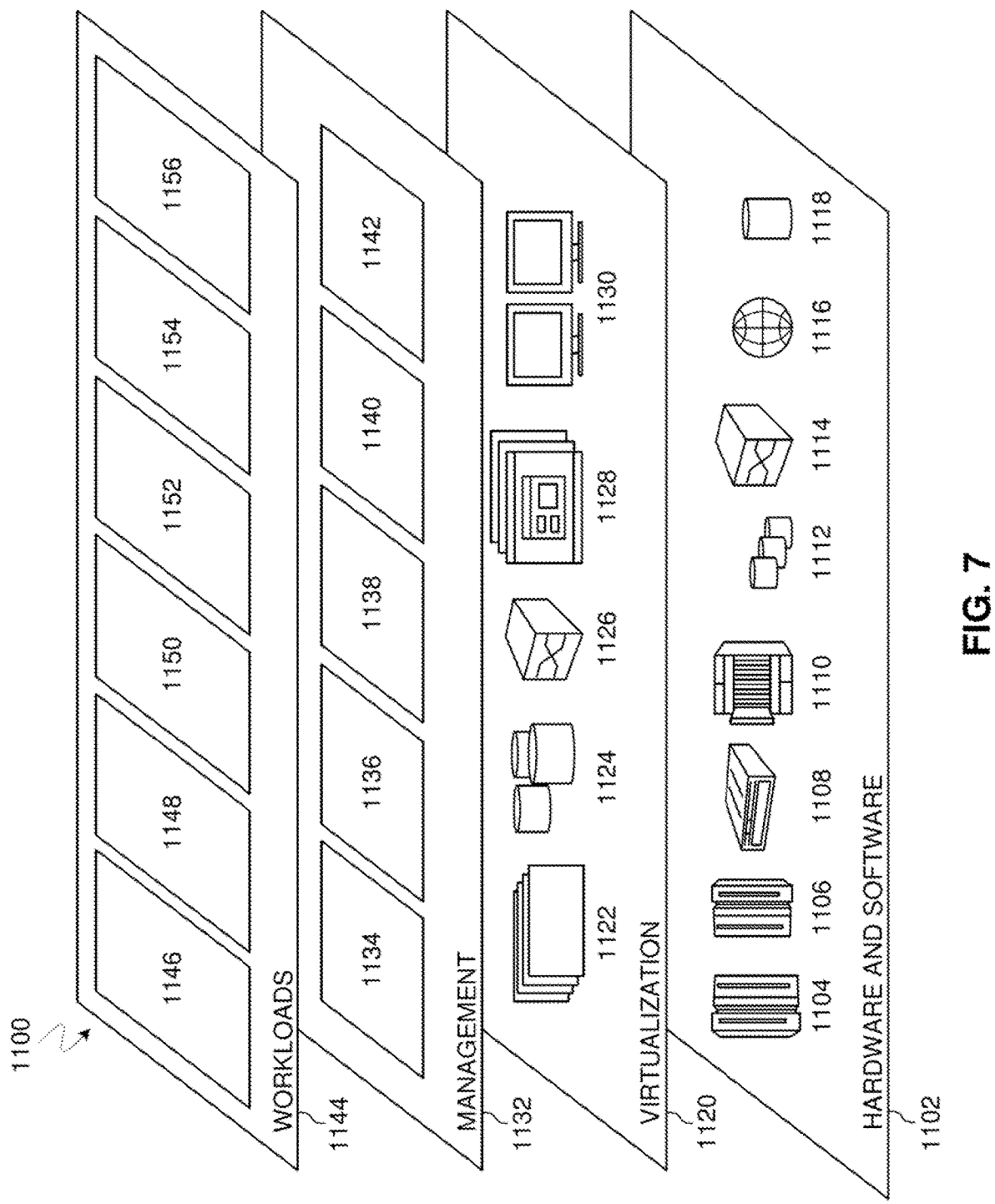
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and media consumption gap filling 1156. A media consumption gap filling program 110a, 110b provides a way to fill gaps for a user while a user waits for a desired program to start.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for media consumption gap filling, the method comprising:

receiving, via a computer system, notification that a first user as turned on a media consumption device;

determining, via artificial intelligence of the computer system, a desired program whose beginning is scheduled to be presented after the current time;

calculating, via the computer system, a first duration, wherein the first duration starts at the current time and ends at a scheduled time for commencement of the desired program;

identifying, via the computer system, first gap-filling content having a duration sufficient to fill the first duration, wherein the first gap-filling content is from a first personalized media corpus associated with the first user; and communicating, via the computer system, the first gap-filling content for presentation of the first gap-filling content;

determining, via the computer system, after the scheduled time for commencement of the desired program whether the desired program has commenced, wherein the determining whether the desired program has commenced comprises:

gathering, via the computer system, information from a broadcast being played on a first broadcast channel during a scheduled time of the desired program;

retrieving, via the computer system, media guide information related to the desired program; and comparing, via the computer system, the gathered information to the media guide information;

in response to a determination that the desired program has not commenced, identifying, via the computer system, second gap-filling content from the personalized media corpus associated with the first user; and communicating, via the computer system, the second gap-filling content presentation of the second gap-filling content.

2. The method according to claim 1, further comprising:
adding to the personalized media corpus associated with the first user;
wherein the adding comprises:
clustering, via the computer system, a plurality of user profiles according to media consumed;
locating, via the computer system, a second user profile in a first cluster of the plurality of user profiles, wherein a profile of the first user is also in the first cluster, wherein the second user profile represents a second user, and wherein a second personalized media corpus is associated with the second user; and
adding, via the computer system, a media content element from the second personalized media corpus associated with the second user to the first personalized media corpus associated with the first user.

3. The method of claim 1, further comprising generating a confirmation check for the first user for confirmation of the desired program that is determined; and
receiving an answer in response to the confirmation check;
wherein the communicating the first gap-filling content is performed in response to receiving the answer and in response to the answer comprising a user confirmation of the determined desired program.

4. The method of claim 1, further comprising presenting the communicated first gap-filling content.

5. A computer system for media consumption gap filling, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving notification that a first user has turned on a media consumption device;
determining a desired program whose beginning is scheduled to be presented at a time after the current time;
calculating a first duration, wherein the first duration starts at the current time and ends at a scheduled time of commencement of the desired program;
identifying first gap-filling content having a duration sufficient to fill the first duration, wherein the first gap-filling content is from a first personalized media corpus associated with the first user;
communicating the first gap-filling content for presentation of the first gap-filling content;
receiving a first user presetting from the first user, wherein the first user presetting comprises a preference for whether gap filling is authorized to exceed the first duration.

6. The computer system of claim 5, wherein the first gap-filling content comprises recap content;
wherein the recap content comprises a recap of previously shown media; and
wherein the previously shown media is related to the desired program.

7. The computer system of claim 5, wherein the first gap-filling content comprises an end portion of a first media content; and
wherein a beginning portion of the first media content had been previously viewed by the first user.

8. The computer system of claim 5, wherein the method further comprises:
adding to the personalized media corpus associated with the first user, wherein the adding comprises:
clustering a plurality of user profiles according to media consumed;
locating a second user profile in a first cluster of the plurality of user profiles, wherein a profile of the first user is also in the first cluster, wherein the second user profile represents a second user, and wherein a second personalized media corpus is associated with the second user; and
adding a media content element from the second personalized media corpus associated with the second user to the first personalized media corpus associated with the first user.

9. The computer system of claim 5, wherein the method further comprises:
determining after the scheduled time of commencement of the desired program whether the desired program has commenced, wherein the determining whether the desired program has commenced comprises:
gathering information from a broadcast being played on a first broadcast channel during a scheduled time of the desired program;
retrieving media guide information related to the desired program; and
comparing the gathered information to the media guide information;
in response to a determination that the desired program has not commenced, identifying second gap-filling content from the personalized media corpus associated with the first user; and communicating the second gap-filling content for presentation of the second gap-filling content.

10. The computer system of claim 5, wherein the method further comprises:
   generating a confirmation check for the first user for confirmation of the desired program that is determined; and
   receiving an answer in response to the confirmation check;
   wherein the communicating the first gap-filling content is performed in response to receiving the answer and in response to the answer comprising a user confirmation of the determined desired program.

11. The computer system of claim 5, wherein the method further comprises presenting the communicated first gap-filling content.

12. The computer system of claim 5, wherein the preference is for flexible gap filling that authorizes the communicating to extend beyond the scheduled time of the commencement of the desired program.

13. The computer system of claim 5, wherein the preference is for strict ending of gap filling so that the communicating ends at the scheduled time of the commencement of the desired program.

14. A computer program product for media consumption gap filling, the computer program product comprising a computer-readable storage medium having program instructions embodied therewith, wherein the program instructions are executable by a computer to cause the computer to perform a method comprising:
   receiving notification that a first user has turned on a media consumption device;
   determining a desired program whose beginning is scheduled to be presented after the current time;
   calculating a first duration, wherein the first duration starts at the current time and ends at a scheduled time of commencement of the desired program;
   identifying first gap-filling content having a duration sufficient to fill the first duration, wherein the first gap-filling content is from a first personalized media corpus associated with the first user;
   communicating the first gap-filling content for presentation of the first gap-filling content;
   receiving a skipping notification that the user chooses not to presently view the first gap-filling content;
   determining a remaining time of unviewed portion of the first gap-filling content;
   identifying second gap-filling content having a replacement duration sufficient to fill the remaining time, wherein the second gap-filling content is from the personalized media corpus associated with the first user; and
   communicating the second gap-filling content for presentation of the second gap-filling content.

15. The computer program product of claim 14, wherein the method further comprises:
   receiving a designation of a social media connection of the first user as a contributor to the personalized media corpus associated with the first user;
   receiving a friend media content from the social media connection; and
   adding the friend media content to the first personalized media corpus associated with the first user.

16. The computer program product of claim 14, wherein the method further comprises:
   confirming the commencement of the desired program, wherein the communicating of the second gap-filling content continues until the confirming of the commencement of the desired program.

17. The computer program product of claim 14, wherein the method further comprises:
   adding to the personalized media corpus associated with the first user, wherein the adding comprises:
      clustering a plurality of user profiles according to media consumed;
      locating a second user profile in a first cluster of the plurality of user profiles, wherein a profile of the first user is also in the first cluster, wherein the second user profile represents a second user, and wherein a second personalized media corpus is associated with the second user; and
      adding a media content element from the second personalized media corpus associated with the second user to the first personalized media corpus associated with the first user.

18. The computer program product of claim 14, wherein the method further comprises:
   determining after the scheduled time for commencement of the desired program whether the desired program has commenced, wherein the determining whether the desired program has commenced comprises:
      gathering information from a broadcast being played on a first broadcast channel after the scheduled time for commencement of the desired program;
      retrieving media guide information related to the desired program; and
      comparing the gathered information to the media guide information;
   in response to a determination that the desired program has not commenced, identifying additional gap-filling content from the personalized media corpus associated with the first user; and
   communicating the additional gap-filling content for presentation of the additional gap-filling content.

19. The computer program product of claim 14, wherein the method further comprises:
   generating a confirmation check for the first user for confirmation of the desired program that is determined; and
   receiving an answer in response to the confirmation check;
   wherein the communicating of at least one of the first gap-filling content and the second gap-filling content is performed in response to receiving the answer and in response to the answer comprising a user confirmation of the determined desired program.

20. The computer program product of claim 14, wherein the second gap-filling content comprises recap content;
   wherein the recap content comprises a recap of previously shown media; and
   wherein the previously shown media is related to the desired program.

* * * * *